US008095915B2

(12) United States Patent
Winberg et al.

(10) Patent No.: US 8,095,915 B2
(45) Date of Patent: Jan. 10, 2012

(54) DATA VALUE COHERENCE IN COMPUTER SYSTEMS

(75) Inventors: Mats Winberg, Stockholm (SE); Lars Winberg, Stockholm (SE); Nils Ola Linnermark, Johanneshov (SE); Marijan Hemetek, East Keilor (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1122 days.

(21) Appl. No.: 11/911,265

(22) PCT Filed: Apr. 13, 2005

(86) PCT No.: PCT/SE2005/000534
§ 371 (c)(1),
(2), (4) Date: Oct. 11, 2007

(87) PCT Pub. No.: WO2006/110069
PCT Pub. Date: Oct. 19, 2006

(65) Prior Publication Data
US 2008/0178157 A1    Jul. 24, 2008

(51) Int. Cl.
*G06F 9/44* (2006.01)
(52) U.S. Cl. ........ 717/128; 717/136; 717/137; 711/140; 711/141
(58) Field of Classification Search ........................ None
See application file for complete search history.

(56) References Cited

U.S. PATENT DOCUMENTS

| | | | | |
|---|---|---|---|---|
| 5,581,729 A | * | 12/1996 | Nishtala et al. | 711/143 |
| 5,768,575 A | * | 6/1998 | McFarland et al. | 712/228 |
| 5,781,753 A | * | 7/1998 | McFarland et al. | 712/218 |
| 5,832,297 A | * | 11/1998 | Ramagopal et al. | 710/5 |
| 5,881,288 A | | 3/1999 | Sumi et al. | |
| 5,930,511 A | * | 7/1999 | Hinsley | 717/164 |
| 5,999,734 A | * | 12/1999 | Willis et al. | 717/149 |
| 6,094,729 A | | 7/2000 | Mann | |
| 6,185,732 B1 | | 2/2001 | Mann et al. | |
| 6,212,629 B1 | * | 4/2001 | McFarland et al. | 712/241 |
| 6,243,304 B1 | | 6/2001 | Patel et al. | |
| 6,397,242 B1 | * | 5/2002 | Devine et al. | 718/1 |
| 6,404,697 B1 | * | 6/2002 | Ryu et al. | 365/230.04 |
| 6,598,128 B1 | * | 7/2003 | Yoshioka et al. | 711/144 |
| 6,704,925 B1 | * | 3/2004 | Bugnion | 717/138 |

(Continued)

FOREIGN PATENT DOCUMENTS

JP            82221296        8/1996

(Continued)

OTHER PUBLICATIONS

Title: Adaptive coherency maintenance techniques for time-varying data, author: RK Majumdar et al, source IEEE dated: Dec. 3, 2003.*

(Continued)

*Primary Examiner* — Chameli Das

(57) ABSTRACT

A system and method for supporting tracking of data values of original source code at execution of a translated target version of the source code on a computer system. The system associates references to target data value containers in the target code with corresponding address information of original data value containers of the source code during program code translation. The system also stores, at execution of the target code, information related to target code instructions together with associated address information of original data value containers of the source code to uphold a data value view of the original source code.

23 Claims, 8 Drawing Sheets

U.S. PATENT DOCUMENTS

| | | | | |
|---|---|---|---|---|
| 7,418,536 B2* | 8/2008 | Leung et al. | | 710/306 |
| 7,472,184 B2* | 12/2008 | Creamer et al. | | 709/224 |
| 7,516,453 B1* | 4/2009 | Bugnion | | 718/1 |
| 7,783,841 B2* | 8/2010 | Fields et al. | | 711/144 |
| 7,904,665 B2* | 3/2011 | Watanabe | | 711/146 |
| 2002/0156962 A1* | 10/2002 | Chopra et al. | | 711/3 |
| 2002/0156977 A1* | 10/2002 | Derrick et al. | | 711/118 |
| 2003/0009637 A1* | 1/2003 | Arimilli et al. | | 711/144 |
| 2003/0018694 A1* | 1/2003 | Chen et al. | | 709/200 |
| 2003/0120902 A1* | 6/2003 | Kottapalli et al. | | 712/216 |
| 2004/0143710 A1* | 7/2004 | Walmsley | | 711/144 |
| 2005/0034578 A1* | 2/2005 | Brandenburg et al. | | 83/13 |
| 2005/0065994 A1* | 3/2005 | Creamer et al. | | 709/202 |
| 2006/0209827 A1* | 9/2006 | Calvignac et al. | | 370/392 |
| 2007/0050603 A1* | 3/2007 | Vorbach et al. | | 712/221 |
| 2007/0214342 A1* | 9/2007 | Newburn et al. | | 712/216 |

FOREIGN PATENT DOCUMENTS

JP    2000 181746    6/2000

OTHER PUBLICATIONS

Title: Maintaining temporal coherency of virtual data warehouses, author: Srinivasan, R et al, source: IEEE dated:Dec. 2, 1998.*

Hennessy, et al. Computer Architecture—A Quantitative Approach. Morgan Kaufman Publishers. 2007.

Ali-Reza Adl Tabatabai, Thomas Gross "Evicted Variables and the Interaction of Global Register Allocation and Symbolic Debugging", Proceeding of the $20^{th}$ ACM symposium on Principles of Programming Languages.

John L Hennessy, David A. Patterson, "Computer Architecture, A Quantitative Approach", Morgan Kaufman Publishers, chapter 3.4 'Data Hazards'.

* cited by examiner

DATA VALUE COHERENCE IN COMPUTER SYSTEMS

CROSS-REFERENCE TO RELATED APPLICATIONS

This application is a national stage application under 35 U.S.C. §371 of International Application No. PCT/SE2005/000534 filed Apr. 13, 2005, the disclosure of which is incorporated by reference herein in its entirety.

TECHNICAL FIELD OF THE INVENTION

The present invention generally relates to the field of computer technology, and more particularly to computer micro-architecture, compiler technology and debugging techniques, and especially the problem of data value coherence in computer systems when translating program code.

BACKGROUND OF THE INVENTION

The field of computer micro-architecture concerns itself with the design of the computer internals in order to support a computing model. Compiler technology is a technology to support the translation of computer program code from one form to another, and debugging techniques are generally techniques to debug, or in other words, to find faults in computer programs.

When translating code from one format to another format, the loss of coherence in code location and data value is a problem. This manifests itself both when translating source code from a high level language down to a target format and when translating code from one "target" format to another "target" format. The source code can thus be translated to target code in one or several steps. In the latter case, any intermediate code formats may be regarded as "source" and/or "target" formats. In each translation step, there will be a source format and a target format, although the source format in a given translation step may have been the target format in the previous translation step.

When source code expressed in a high level language is transformed and optimized during the translation into target code, a straightforward mapping between target registers and source variables can not be upheld. The transformation process moves and deletes instructions operating on variable values. It may also use different registers or memory positions to hold the values of variables at different points in the translated program. It may even use a register to hold the value at the same time as other variables are holding their values in that same register or memory position. Furthermore it may have removed the value-holding register during parts of a variable's live range; replacing the register with a load of a constant or, as mentioned above, using a register that holds also one or more values from other variable(s). To report the residency of variables, that is, in which registers or memory positions they reside and what values they have at a certain program point is a technical problem. To report not only the current values, but also the expected values of a variable at a certain program point when executing is also a problem.

In particular, when binary code targeted for execution on one type of machine or system is transformed and optimized for another type of machine or system, values which were stored in certain registers in the original binary code will be stored in other registers in the resulting code. To present the state (such as register contents) of the original architecture after optimizations and adaptations to the target architecture is a particular problem within the field of computer technology.

The general problem of loss of coherence dissolves into the following main questions:

How to map instruction addresses in target code representation to instruction addresses in source code representation?

How to map addresses to data value containers such as registers or memory variables in target code representation to addresses of data value containers in source code representation?

How to map multiple active instances of data value container addresses in target code representation back to correct data value addresses in source code representation?

The first question formulates the problem of code location. The two last questions concern the data value problem.

The data value problem is sometimes formulated as the problem of reporting or tracking the expected values of original registers (or variables in the general high level language case) that are expected at a certain program point.

The problem of determining if an original register or variable is accessible in its assigned register is typically referred to as the residence problem as outlined in reference [1].

Reference [1] makes the observation that to detect a variable's residency conservatively, it is sufficient to use the live range of the variable, that is, the range in the code from the assignment of the variable to a register until the register's last use in another instruction. But the residency may continue until another value is assigned the register containing the variable's value. That program point is the variable's eviction point. In [1], detection of eviction points of a variable is carried out by applying data flow analyses on the optimized code in the debugger.

RELATED ART

Reference [2] relates to a built-in debug support device that realizes a multi-processor simulating environment on plural general purpose computers to improve debugging efficiency.

Reference [3] concerns a software debug port for a microprocessor. When used in conjunction with an on-chip trace cache, the software debug port provides trace information for reconstructing instruction execution flow on the processor and is also capable of examining register contents without halting processor operation.

Reference [4] relates to a debug support device with a debug exception control part that preserves a register state when the generation instruction of a debug exception from a CPU core is received, and changes a program counter to the address of a debug exception handler, and returns the register to a state before the debug generation when a restoration instruction is received.

Reference [5] discloses a debug interface with a compact trace record storage having a plurality of trace data storage elements. The storage elements have a format including a trace code field indicative of the type of trace information and a trace data field indicative of the type of trace information data.

Reference [6] relates to a programmable logic device (PLD) that provides the capability to observe and control the logic state of buried internal nodes. The PLD provides shadow storage units for internal nodes such as logic element registers, memory cells and I/O registers. A sample/load data path includes bidirectional data buses and shift registers that facilitate the sampling of internal nodes for observing their logical states, and loading of internal nodes for controlling their logical states.

SUMMARY OF THE INVENTION

It is a general object of the present invention to enable and support a general solution to the data value problem.

It is a specific object to provide a solution to the so-called residence problem in a computer system when executing program code translated from a source code representation into a target code representation.

In particular it is desirable to provide a mechanism to support data value coherence between the original source code and the translated target code.

It is a specific object of the invention to provide a method for supporting tracking data values of original source code at execution of translated target code on a computer system.

It is another specific object of the invention to provide a device or module for upholding a view of data value containers, such as registers or memory variables, of original source code when executing corresponding translated target code on a computer system.

It is a specific object to support register coherence between original registers and target registers.

In particular, it is an object to maintain a data value view of an original computer system after optimizations and adaptations of the program code to a different computer system, especially when binary code targeted for execution on the original system is transformed and optimized for the target system.

These and other objects are met by the invention as defined by the accompanying patent claims.

As mentioned, the invention concerns the general data value problem, and especially the residence problem in a computer system when executing program code translated from a source code representation into a target code representation.

A basic idea of the invention is to associate references to target data value containers in the target code with corresponding address information of original data value containers of the source code during program code translation, and store information related to target code instructions together with associated address information of original data value containers at execution of target code to uphold a data value view of the original source code representation. In this way, tracking of data values of original source code at execution of translated target code in the target system is supported in a highly efficient manner.

Examples of data value containers include ordinary microcomputer registers as well as memory-allocated variables in a high-level programming language. For the register case, the invention consequently provides support for register coherence between an original register set of the source code and a target register set of the target code. The case involving memory variables reflects a solution to the more general data value residency problem.

The invention also makes it possible to maintain a data value view of an original computer system after optimizations and adaptations of the program code to a different computer system.

In a preferred embodiment of the invention, target code instructions are tagged during code translation with respect to data value coherence to provide an association between target data value containers (such as target registers or target variables) in the target code and original data value containers in the source code.

Preferably, the information stored together with the associated original data value container addresses at target code execution includes corresponding target instruction address information and/or corresponding instruction operand values. In the latter case, tracking of values of original data value containers without reference to any target data value containers is allowed.

Advantageously, the above tracking information is written into a specially designed extra register file, referred to as a ghost register file in the following, and preferably implemented as a hardware register file in the micro-computer architecture.

The tagged target instructions include one or more target instructions representing an assignment of an original data value container such as a register or variable in the source code. To provide full tracking support, data value container address information of the original source code can be moved from one entry (or register) to another in the ghost register file. In this way, the invention inherently supports the case where different original register (or variable) values might be assigned a target register (or variable) depending on the execution path taken. This is also true for the case where different instances of an original register (or variable) have been translated into parallel instances of target registers.

In order to consistently reflect the residency of original data value containers in the target system, the invention preferably also includes logic for upholding sequential consistency of ghost register file operation.

Furthermore, the invention preferably also provides operation stream processing for selectively transforming ghost register file operations. The operation processing logic typically transforms operations siphoned off the processor's ordinary operations stream into assignment, move, store and nop operations targeted for the extra register file. The transformation is normally governed by the original ordinary operation and the preceding transformed operations in the extra register file's so-called read latency window.

An extra field in the instruction words of the target code, an extra register file and some operation processing logic thus enable the states of data value containers of the original source code, in addition to the states of the target data value containers, to be maintained at target code execution, and, if required, even the states of two different computer architectures.

In addition to the ghost register file or equivalent memory device, the invention provides both individual "compile-time" and "run-time" components, as well as an integrated system combination of such individual components. Examples include a compile-time component operable for performing the so-called tagging, and a run-time component operable for storing relevant information in the ghost register file.

The invention offers the following advantages:

Solution to the data value residence problem for both variables and registers.

Support for data value coherence in computer systems.

Improved capabilities for efficient debugging and trace analysis.

Enabling tracking of data values of original source code at execution of translated target code.

Possibility to maintain a data value view of an original source code representation when executing corresponding translated target code.

Register coherence support.

Support for data value tracking of an original computer system after optimizations and adaptations of the program code for execution on a different computer system.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
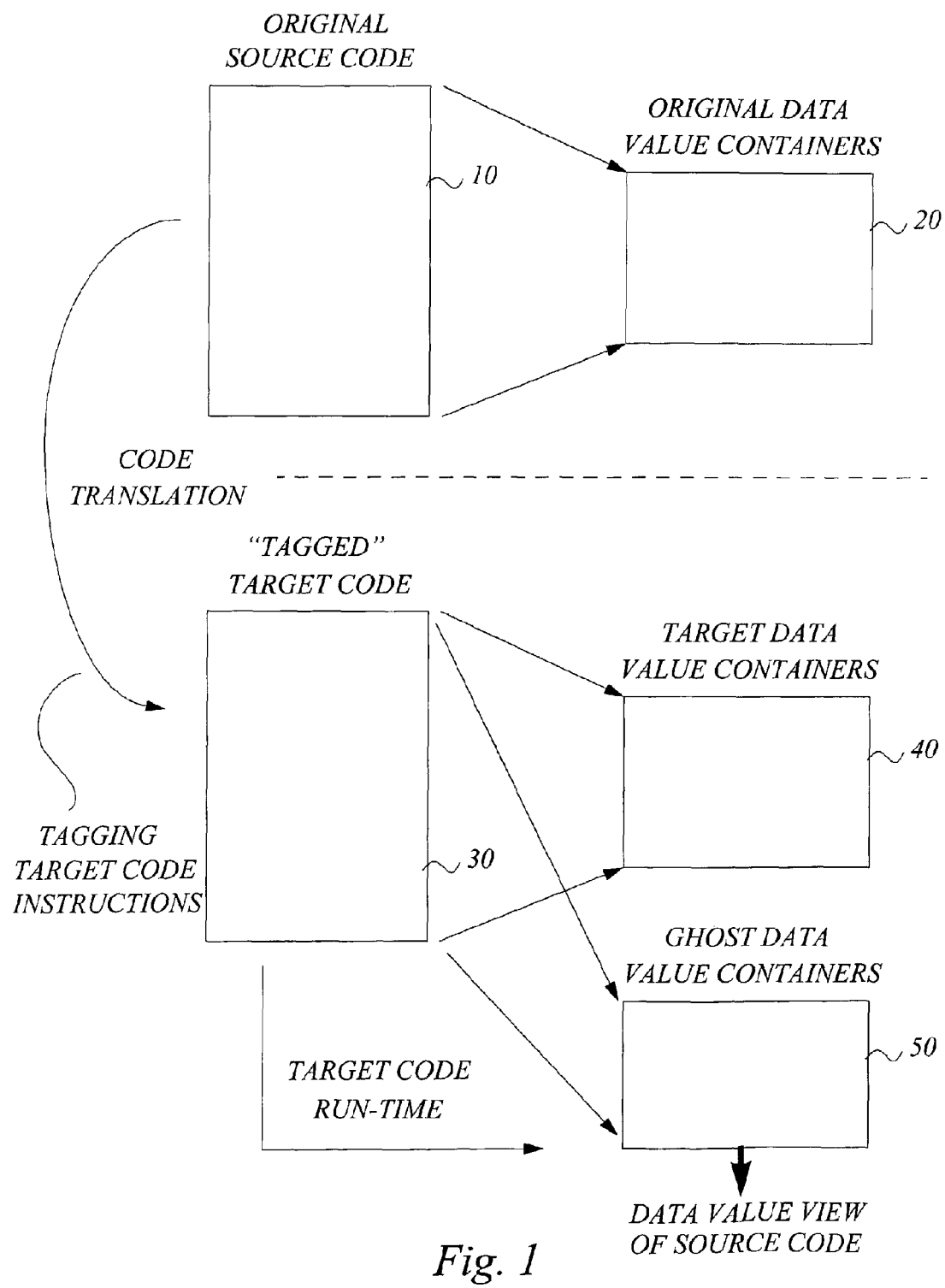
FIG. 1 is a schematic diagram illustrating a mechanism for supporting data value coherence between original source code and target code according to a preferred embodiment of the invention.

Throughout the drawings, the same reference characters will be used for corresponding or similar elements.

The data value problem has not been fully addressed or solved in the past, and especially hardware support for tracking original data value container values in a computer system subject to optimizing code translation has not been addressed by the microprocessor industry nor by academia. Such support would alleviate debugging of computer programs on such a system considerably.

The invention will first be described in a general context as a general solution to the data value residency problem. Subsequently, the invention will be exemplified in the contexts of register coherence support and tracking of memory variables in a high-level language, respectively.

FIG. 1 is a schematic diagram illustrating a mechanism for supporting data value coherence between original source code and target code according to a preferred embodiment of the invention. The program code is given in an original source code representation, simply referred to as the source code 10, and operates with respect to a set of data value containers 20 such as registers or memory variables. The data value containers of the original source code are referred to as original data value containers. The source code 10 is translated into a target code representation, simply referred to as target code 30. The target code 30 operates with respect to another set of data value containers 40. The data value containers of the target code are referred to as target data value containers. The code translation normally includes code transformation, optimizations as well as register allocation and allocation of static variables. However, according to the invention, an additional task during the program code translation is to associate references to target data value containers in target code instructions with corresponding address information of original data value containers of the source code. Preferably, this is accomplished by tagging the target code instructions with the relevant information concerning the original data value containers. For example, the tagging process may mark (or tag) an instruction's destination container with the address/name of the original container. During target code run-time, when executing the tagged target code 30, instruction operand values are assigned to the target data value containers and usually also moved between different target containers. In addition, according to the invention, information related to the target code instructions is stored together with associated address information of original data value containers in a set of so-called 'ghost' or 'shadow' data value containers 50. In this way, a data value view of the original source code representation can be maintained or upheld at target code run-time, thereby considerably facilitating debugging and/or trace analysis.

The data value containers 50 for upholding the data value view of the original source code are preferably implemented in a 'ghost' register file in the micro-computer architecture, although alternative implementations exist including the use of an ordinary transaction memory. The 'ghost' data value containers 50 may also be memory positions allocated to variables in a high-level programming language.

Figure 2:
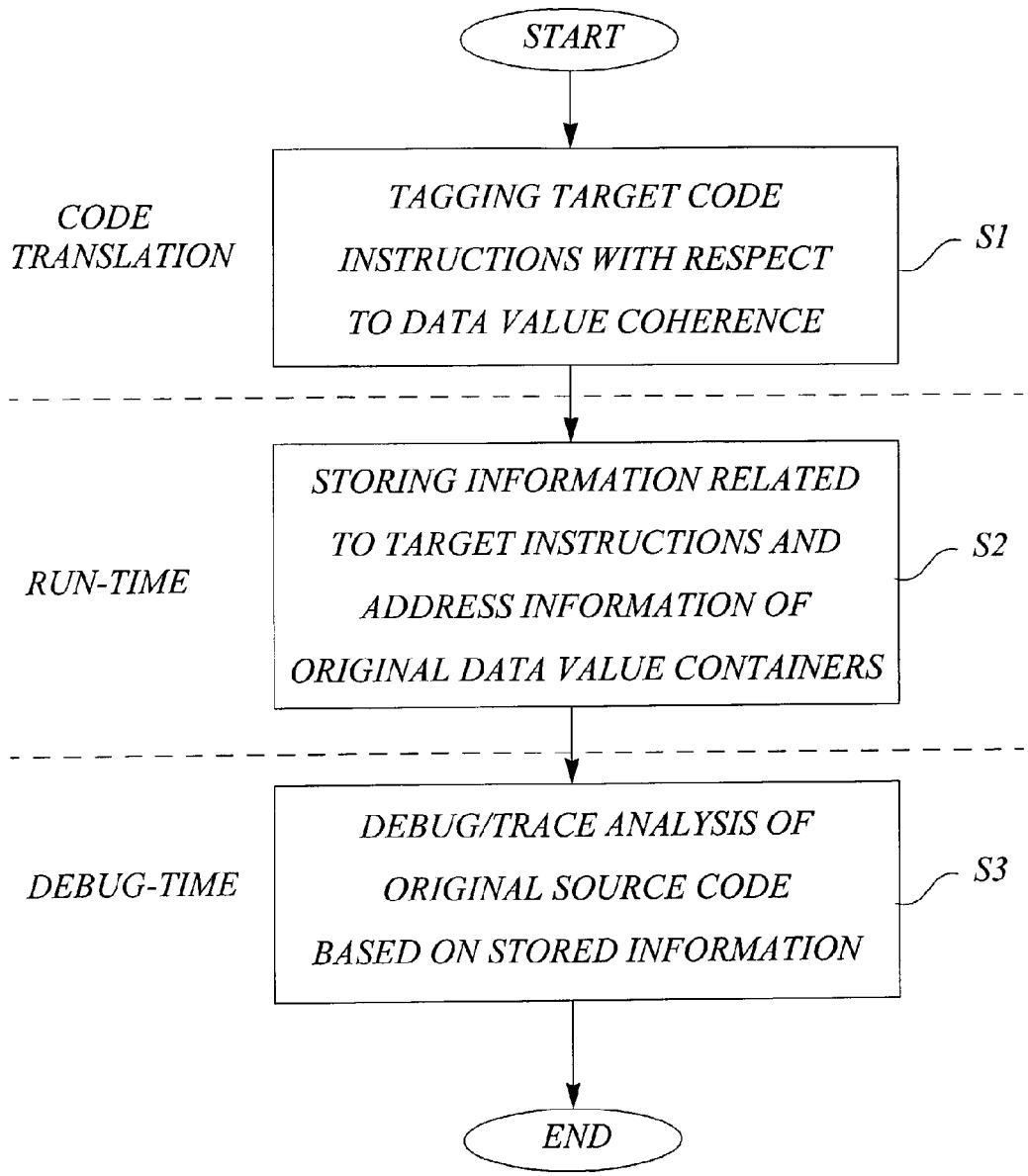
FIG. 2 is a schematic flow diagram of an exemplary overall method for tracking data values of original source code at execution of corresponding target code, including debugging and/or trace analysis.

FIG. 2 is a schematic flow diagram of an exemplary overall method for tracking data values of original source code at execution of corresponding target code, including debugging and/or trace analysis. In the code translation phase, the target code instructions are preferably tagged with respect to data value coherence to provide an association between target data value containers (such as target registers or target variables) in the target code and original data value containers in the source code (S1). At execution of the target code, information such as target instruction address information and/or corresponding instruction operand values are stored together with the associated original data value container addresses (S2). At the debugging phase, the original source code can be analyzed based on the stored tracking information. As will be explained later on, when target instruction address information and original data value container addresses are stored as tracking information, the debug utility can use the target instruction address information to recreate the values which are active in the optimized target code. If the instruction operand values themselves are stored, tracking of values of original data value containers can be made without reference to any target data value containers.

The code analyzer and translator, typically a compiler, normally analyzes the code to provide data value container information of the original source code that can be used later, during execution of the resulting target code, together with selected run-time information to provide a data value container view of the original source code.

The invention thus provides a solution of the data value residency problem, and especially the problem of reporting variable values (in the high-level language translation case) or original register values (in the binary translation case) as they are set by the translated optimized code and/or reporting which target registers they reside in at the trace/breakpoint.

Register Coherence

In the following, a detailed analysis of the data value problem will be made with regard to original registers in original code and target registers in target code.

In order to illustrate different register coherence problems, two basic code examples are given below. The registers in the original architecture are named original registers, OREGs. The registers pertaining to the target architecture are named target registers, treg:s.

EXAMPLE 1

| | |
|---|---|
| ld tregB, ADDR0; | // target register tregB gets value from<br>// memory at address ADDR0 |
| mv tregA, tregB; | // Value of target register tregB is moved<br>// into tregA |
| ld tregB, ADDR1; | // tregB gets new value |
| ... | |
| st tregA, ADDR2; | // Former value of tregB is spilled<br>// to memory in address ADDR2 |
| ... | |
| ld tregC, ADDR2 | // Former value of tregB is reloaded<br>// into register tregC |
| conditional_jump L1; | |
| mv tregC, tregD;<br>L1) | // Value of tregD is loaded into TREGC |
| mv tregE, tregC; | // Value of tregD or former value of tregB<br>// is used in assignment of tregE |

Suppose tregB initially got the value of the original register OREG1 from the memory cell at ADDR0(that is, the first original instruction loaded OREG1 from ADDR0) and tregD contained the value of OREG2, which value did tregE get at L1? The answer to that question is depending both on which path through the code that is executed and which information the compiler can give about the assignments. This implies a solution to the problem where both dynamic as well as static information is used.

The optimization process could also distribute the values in an original register at different time points in the original code, to the same time point in the target code. This is demonstrated in example 2.

EXAMPLE 2

| | |
|---|---|
| LD OREGA, ADDR1; | // Load OREGA with value in memory address<br>ADDR1 |
| .... | // Compute chain here based on value in OREGA |
| .... | // Assume result in OREGB |
| ST OREGB, ADDR1 | // Store new value in memory |
| LD OREGA, ADDR2 | // Load OREGA with another value |
| ... | // Another compute chain based on new value |
| ... | // Assume result in OREGC |
| ST OREGC, ADDR2 | // Store next new value in memory |

Here, the OREGA register is used for values at different times. In a wider issue machine, e.g. a VLIW (Very Long Instruction Word) machine, these two compute chains could have been parallelized.

```
// The two instances of OREGA have been translated to two
// parallel instances kept in treg17 and treg19.
   ld treg17, addr1; ld treg19, addr2; nop; nop;
// The two compute chains are parallelized over the
// VLIW machines functional units.
   ....
// The store is also parallelized, result in gr21 and gr23
   st treg21, addr1, st treg23, addr2
```

This poses a problem since the debugger and/or trace utility need to know which value that constitutes which instance of OREGA.

In our approach, the dynamic computation in the target system is normally tapped of which original registers (in the binary translation case) or variables (in the high level translation case) that are assigned to which target registers. This information is preferably maintained in a 'ghost' register file. Thus, at any given point the residency of original registers (or variables) are determined by searching the 'ghost' register file. Original registers (or variables) found there are resident and those not found are not resident.

For a translation system's residence problem with respect to original registers or variables in the source code our approach compared to [1] thus trades data flow computations in the debugger with a relatively simple hardware implementation combined with tagging of instructions in the compiler with the original registers at certain assignments.

An advantage of this approach is that an evicted original register (or variable value) can still be reported as long as it is not evicted by another original register (or variable) value.

In the following, it is assumed that the source instruction addresses are attributed to the corresponding target instructions during compilation and presented to a trace/debug utility in an appropriate way.

In a preferred embodiment, the destination register encoding in the target instruction primitive, such as a VLIW or RISC primitive, has an extra field for the original register address. If this field has a valid original register address, the result of the operation will also be written into the ghost registers upholding the coherence of the original register set. This ghost register set will never be read except for trace and debugging purposes. There is thus a tolerance of large operation latencies towards the ghost register file. This means that the ghost register file is off the critical path and the access to it could be pipelined to meet timing requirements, and the ghost register file could be placed just about anywhere on the chip. If 'original register values in target register' tracking is to be supported, the ghost register file normally transfers emulated register tags between ghost register elements. This is also the case when move operations are not original register tagged when "original register value only" tracking is supported. In these cases there is typically a need for reading from the ghost register file as the move operation is a combined read and write. The move operations infers dependencies onto adjacent GRF operations due to the GRF latencies. This can be dealt with by exploiting the tolerance of large GRF operation latencies. More about this below.

The compiler, which is aware of the mapping from the original register set to the target register set, tags an instruction's destination register with the address/name of the original register if the instruction represent an assignment of the original register in the source code. In the examples above this would mean:

EXAMPLE 1

| | |
|---|---|
| ld tregB (OREG1) , ADDR0 | // Value of original register<br>// OREG1 is loaded into tregB |
| mv tregA(OREG1), tregB; | // Value of original register<br>// OREG1 is moved into tregA |
| ld tregB, ADDR1; | // tregB gets new value |
| ... | |
| st tregA, ADDR2; | // Value of OREG1 is spilled<br>// to memory in address ADDR1 |
| ... | |
| ld tregC(OREG1), ADDR1 | // Value of OREG1 is reloaded<br>// into register tregC |
| conditional_jump L1; | |
| mv tregC(OREG2), tregD;<br>L1) | // Value of OREG2 is loaded into tregC |
| mv tregE, tregC; | // Value of OREG1 or OREG2<br>// is used in assignment of tregE |

The compiler cannot deduce whether the value of original register OREG1 or OREG2 will be assigned to tregE since this depends on which way the statement at L1 is reached. Without dynamic information it is thus not possible to tell if the value of OREG1 or OREG2 is assigned to tregE. What can be deduced however is that the latest value of OREG1 is the value from ADDR0 since no other value has been assigned a target register with the tag OREG1. In the same way the latest value of OREG2 is the value of tregD (where tregD of course could have gotten its value from memory earlier, just as OREG1 did).

Example (1) implies that to just keep the latest values of original registers it is sufficient to tag the target destination registers with the original destination registers at compile/link time and then to write the value to the ghost register at runtime. To keep track of where the original register values reside at every point in the program, it is necessary to have support at runtime in the ghost register file for the case where different original register values might be assigned a target register depending on the execution path taken. As will be explained below, this is preferably accomplished by means of a special ghost register operation type moving information within the ghost register file.

EXAMPLE 2

| |
|---|
| // The two instances of OREGA have been translated to two<br>// parallel instances kept in gr17 and gr19.<br>ld treg 17(OREGA), addr1; ld treg 19(OREGA), addr2; nop; nop; |

An extra field in the target instruction words, an extra register file and some operation processing logic thus enable the states of data value containers of both the original source code and the translated target code to be maintained at target code execution, and, if desired, even the states of two different computer architectures when the target code is optimized for execution on a target system different from the original system.

Figure 3:
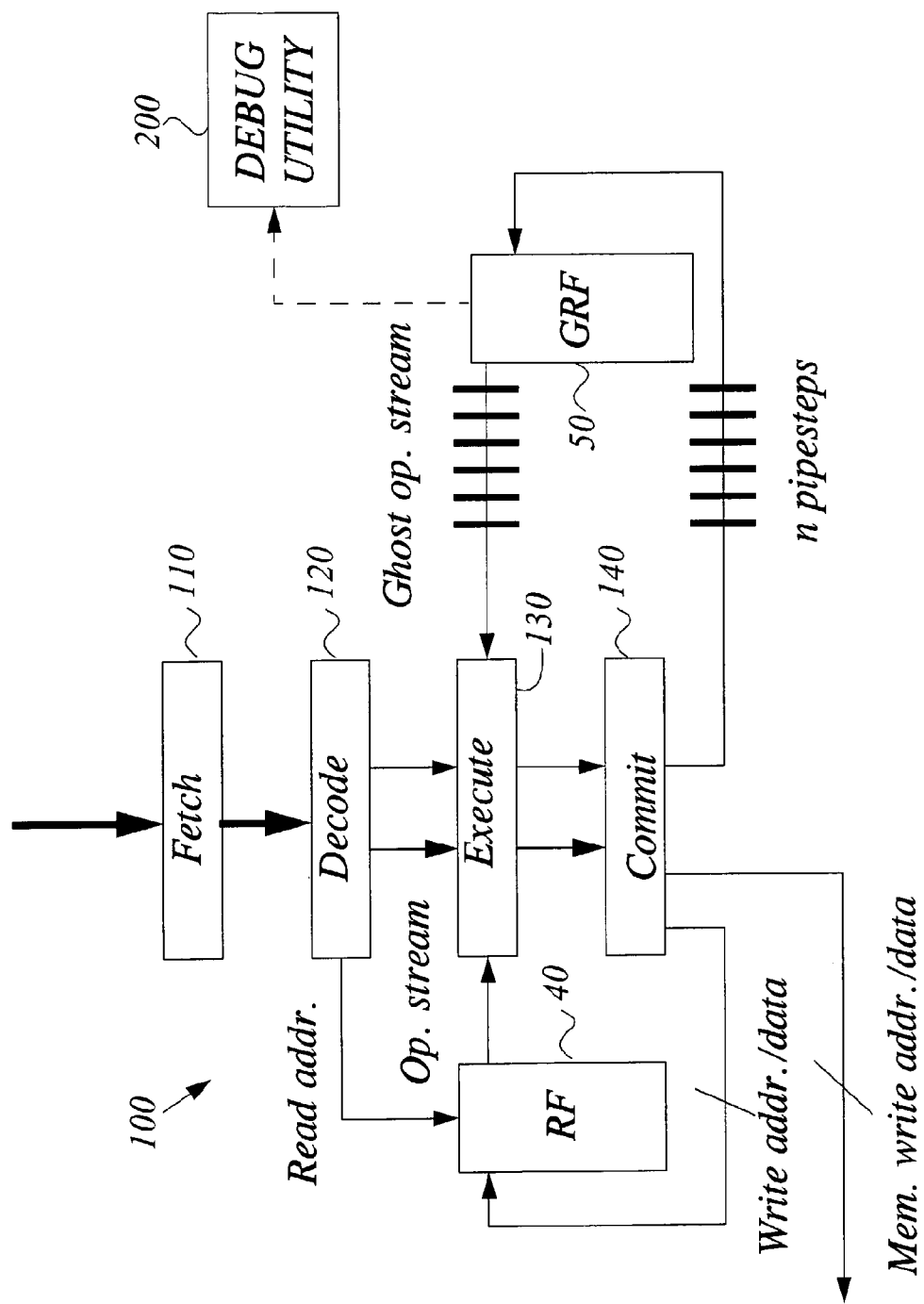
FIG. 3 illustrates a ghost register file in an exemplary processor environment according to a particular embodiment of the invention.

FIG. 3 illustrates a ghost register file in an exemplary processor environment according to a particular embodiment of the invention. In a simplified view, the exemplary processor 100 has four stages: Instruction Fetch 110, Decode 120, Execute 130 and Commit 140. The processor system also has an ordinary register file 40 and a ghost register file 50. The ghost register operations are decoded from the ordinary code stream in the Decode stage 120 and committed to the ghost register 50 when the ordinary instruction operating upon memory and ordinary architectural register file 40 is committed. The write data path from the ghost register file to memory uses the ordinary memory write data paths. Preferably, the ghost register file 50 resides a number of pipe steps away from execution pipe for possibly handling read latency. The actual number is chosen to ease the implementation. The memory read data path is omitted as well as other necessary common structures, such as data read address bus, instruction address bus and so forth.

The tracking information stored in the ghost register file (GRF) 50 can be read by a debug utility 200 for performing debugging and/or trace analysis of the original source code. The debug utility may of course also read information from the ordinary register file 40 to support target code debugging. The debug utility reads snapshots of the GRF stored in memory. In practice, a snapshot of the GRF is normally taken by ordering the contents of the GRF into memory by executing ghost store operations, just like the ordinary register file is stored to memory by (ordinary) store operations. The actual encoding of the ghost store operation could be in the opcode field or in the address field.

In a particular embodiment of the invention, from the compiler/linker point of view, there are three ways an instruction can write to the registers, the register write destinations:
1) Write to target register ONLY.
2) Write to target register AND write to ghost register also.
3) Write to ghost register ONLY.

The ghost register set may for example be under three write modes. The write modes includes different sets of register write destinations among the instructions which writes to registers.

The first write mode is the case where no register coherency information is written. Only register write destination case 1 is found among instructions in this mode.

The second write mode is the standard register coherency support case, that is, only destination registers in non-removed statements assigning an original register are tagged. Register write destination cases 1 and 2 could be found among instructions in this mode. That is, instructions with destination registers which are not tagged with an original register will be written to a target register, whereas instructions with destination registers which are tagged with an original register will be written both to a target register and a ghost register.

The third write mode is an extra register coherency support case, that is, the compiler will keep a 'ghost' assignment statement where the destination register is tagged with both the original register tag and a write destination 3 tag even though the real assignment has been removed in an optimization. In this write mode, all register write destination cases are found among the instructions. This means that in addition to register write destinations case 1 and 2 (second write mode), the register write destination case 3 is found among instructions in this mode. The instructions with register write destination 3 represent instructions that have been removed by the compiler during optimization.

The third write mode is mostly of theoretical interest in the context of register coherence, since the register allocation cannot separate the assignment of ghost registers from target registers, that is, the register allocation will allocate over removed instructions also. The presence of ghost-only assignments in the code might thus introduce effects on the register usage and spill (depending on the register file size). There could be remedies to these problems, such as only use of the third write mode for one or a few original registers, dividing the target register set (if large enough) into two sets (one large for real assignments and one smaller for ghost assignments) or only use the third write mode in conjunction with 'tracking of original register values only'.

When used, the write modes are specified in a processor control register.

The debugger/trace utility will have access to a set of ghost registers as well as the instruction address at which each of the ghost registers was written. It will also have the register write destination identification, so that it can deduce how the ghost register was written. This will enable the utility to recreate the original register values that are active in the optimized target code.

The ghost register file normally contains as many entries as the number of registers in the target architecture, and preferably also a spill area. If this spill area is as large as the target register set all ghost registers could easily be spilled. Each entry preferably includes the original register number together with the instruction address where the register was written and/or the data value stored.

In a specific exemplary implementation, additional optional information is added so that each entry preferably includes the following fields:

TABLE I

| OR | RWD | TMIA | E | V |
|---|---|---|---|---|

OR—Original Register number
RWD—Register Write Destination (normally 1 bit, encoding case 2 and 3)
TMIA—Target Machine Instruction Address
E—Evicted Value (normally 1 bit)
V—Value When tracking the original register values in target registers, the value field (V) is not needed since the value is found in the corresponding target register.

When tracking the original register value only, the value field (V) is needed since the target register may be assigned new values, in which case the old value(s) will be evicted from the target register.

The RWD field is typically produced by a mode value in the processor control register for the second write destination (the first will never be present in a ghost register). The third write destination is assigned the RWD field if the processor is in third write mode and the target and the target destination register is defined as void. The encoding of a target register non-modifying operation could also be done via a bit in the opcode or a mode bit field as well as a bit in target destination register. If only register write destination 2 is needed, the RWD field can be omitted.

Another option (to save instruction bits) is to use one register entry in the register address map as a void marker. Writes to this register entry will not change its content. This register entry could be used to always produce a zero if used.

If the E-bit is set, the value (V) is evicted from the target register at the TMIA by a non-original register value.

Figure 4:
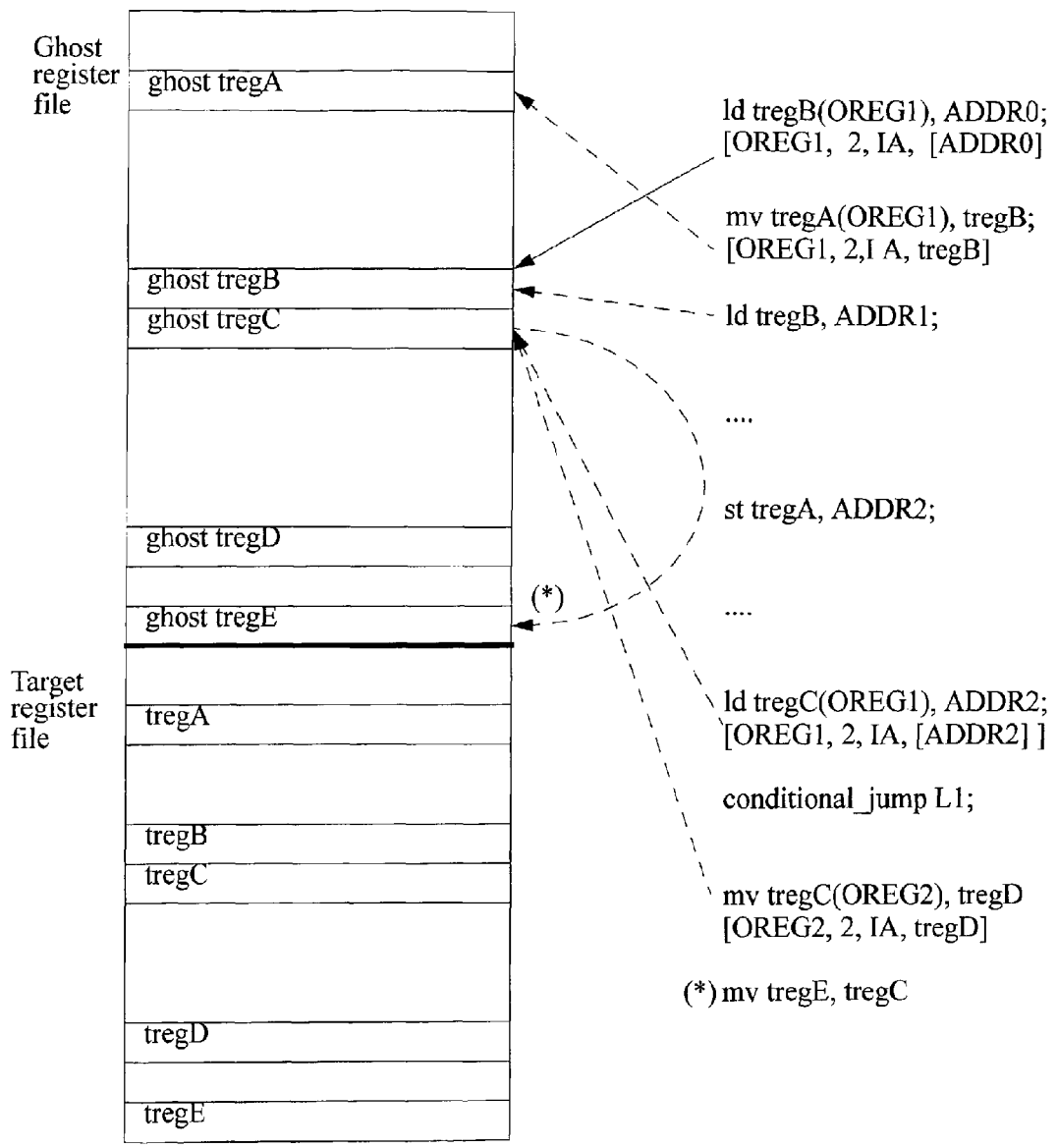
FIG. 4 is a schematic diagram of a target register file and a ghost register file showing examples of different uses of the ghost register file.
Figure 5:
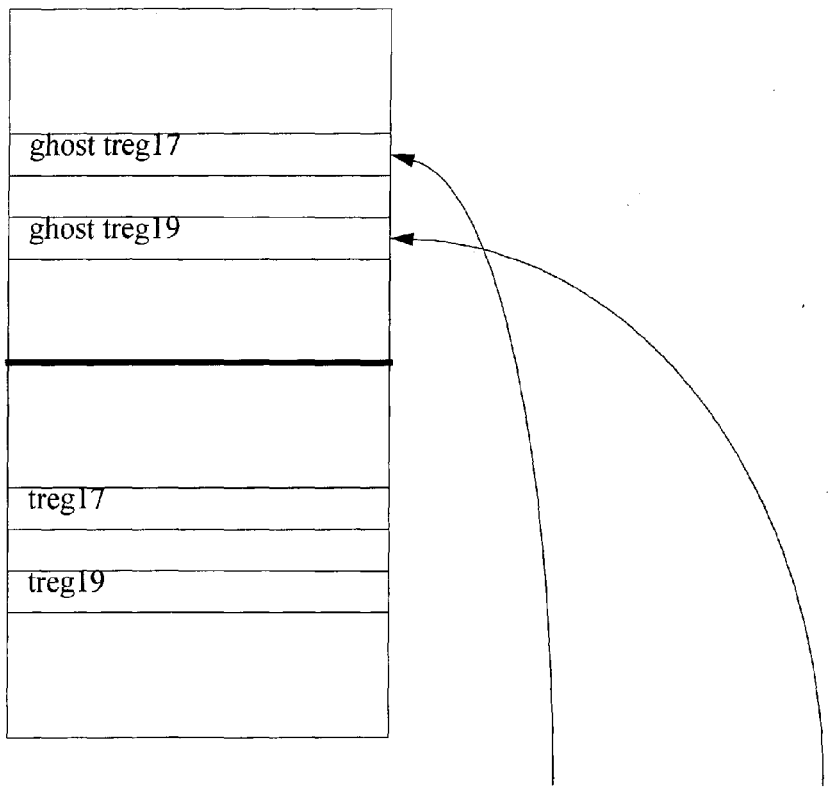
FIG. 5 is a schematic diagram of a target register file and a ghost register file showing an example of use of the ghost register file when target registers in the sequential code has been parallelized so that sequential target registers have several parallel instances.

FIGS. 4 and 5 illustrate exemplary operations on a ghost register file in the cases of 'sequential code' and 'parallel code', respectively. The ghost register file and the target register file are depicted to be adjacent. This is generally not the case, in order not to interfere with routing and placement around the target register file. The figures just provide a logical view. FIGS. 4 and 5 correspond to examples 1) and 2) described above.

Example 1) of FIG. 4 is used for showing the different uses of the ghost register file when 'tracking of source register values in target registers' is enabled and when 'tracking values of source registers only' is enabled. For clarity, the V field is present here in both cases. Example 1) is presented as sequential code, that is, it has not been parallelized into for example VLIW instruction words. The use of the ghost register is the same irrespective of whether it is written from a RISC instruction word or a VLIW instruction word.

The solid arrow line in FIG. 4 indicates the operation when tracking values of source registers, and the dashed arrow lines indicate added operations when tracking source register values in target registers. For example, the operation to load the value in ADDR0 into target register tregB, 'ld tregB (OREG1), ADDR0', executed at target instruction IA, implies that the information [OREG1, 2, IA, [ADDR0]] is written to the ghost register 'ghost tregB', where OR is OREG1, RWD is equal to 2, the target machine instruction address is IA, and the value V is taken from the memory position at ADDR0. The operation to move the value of tregB into treg A, 'move tregA(OREG1), tregB', is mapped into the ghost operation of assigning the value of tregB to ghost register ghost tregA, where OR equal to OREG1, RWD equal to 2 and the instruction address of the move operation are also written into ghost tregA: [OREG1, 2, IA, tregB].

In example 1) move operations are tagged by the compiler with the original register address when that can be statically deduced. Another alternative is not to tag the move operations at all (only the initial assignment or load operations) and instead let the ghost move operations always copy the ghost source register value (OR, RWD, TMIA, E, V) to the ghost destination register. This alternative is presupposed in the description of ghost register file operations as well as the compiler description below.

A control bit (EVICT) in processor control register defines if non-tagged target register assignments (i.e. non-valid register address in ghost register field) should invalidate earlier assignment of original register address (OR) in ghost register. This will enable two different uses. If original register values in target registers should be tracked then EVICT should be set always. The EVICT control bit is thus only meaningful if original register values is of interest only. If cleared, the original register values are kept even when they are not present in the target registers, they will only be overwritten by instructions tagged with an original register. If set, the original register values could be ousted from the ghost register file by a non-tagged assignment. This could be summarized in Table II below:

TABLE II

| | Process control bit EVICT | |
|---|---|---|
| Tracking mode ! V | Clear "no write over" | Set "write over" |
| Original register value only | Original register values are kept also when they disappear from target registers | Original register values are not kept when they disappear from target registers |
| Tracking of original register values in target registers | Illegal, since the tracking will be erroneous if ghost registers are not updated correctly | Tracking of original register values in target registers enabled |

If snapshots or post-mortem analysis is to be performed, the tracing is disabled and the ghost register memory is read and written to main memory via a ghost register dump routine.

By inserting traps to the ghost register dump routine, snapshots or checkpoints of the original architecture register set can be saved for later analysis.

Example 2) of FIG. 5 is used to show the use of the ghost register file when target registers in the sequential code has been parallelized so that 'sequential' target registers have several parallel 'instances'.

Ghost Register File Internals

The ghost register file (including the spill area) is a scratchpad which upholds a register view of the original source code, or an original architecture emulated on a target architecture. This scratchpad is operated upon by two basic types of operations.

Ghost Register Operation Types

One operation is the assignment operation, which is the side-effect of an arithmetic or load instruction in the execution pipe. These arithmetic or load instructions explicitly names the corresponding original register names in its original register destination field.

The other operation is the move operation. This move operation originates from the move instruction in the execution pipe. The difference here is that this operation does not have an explicitly named original register to write into the ghost register file. The move operation must copy the OR field of the ghost register entry indexed by the move operations source target register number to the ghost register entry indexed by the move operations destination target register number.

All move operations in the target register file will not incur move operations in the ghost register file. For example, move operations which are not OR-tagged in the non-evict case will be a NOP when it reaches the ghost register. Move operations which are OR-tagged will be transformed to a ghost register assignment operation.

A ghost store operation is used to write ghost register content into the memory. The ghost store operation is used when taking snapshots of the ghost register content at observation points in the code stream. The code containing ghost store instructions could be code in exception or interrupt routines or ordinary code depending how you would want to set up the observation. These observation snapshots are then used as input to analyzing debugging software.

A NOP instruction is an empty operation which do not operate upon the ghost register file.

The ghost move operation must read from the ghost register file in order to be able to write its OR value into the ghost register file. The assignment operation only needs to write to the ghost register file. The assignment operation supports the static conveying of OR information from the compiler into the ghost register file. The move operation supports the dynamic, execution-dependent conveying of OR information in the ghost register file.

In order to support the move and assignment operations, a preferred solution is to provide the ghost register file with one write port and one read port per active functional processor unit, i.e. for each active operation-producing entity within the processor. In other words, one read and one write port per issue slot.

Ghost Register Operation Sequential Consistency

As the read operation have a latency before completion, we need some extra logic to uphold the sequential consistency in the operation stream. The result of a move operation read must be written before any other operation later in the stream either reads the move operation's destination entry or writes it. If this consistency is not upheld, the ghost register file would not portray the register state of the original architecture according to the assignment and move operations specified by the compiler and the dynamic execution path of the target machine. For a general discussion on data hazards in an execution pipeline context, see reference [7].

Figure 6:
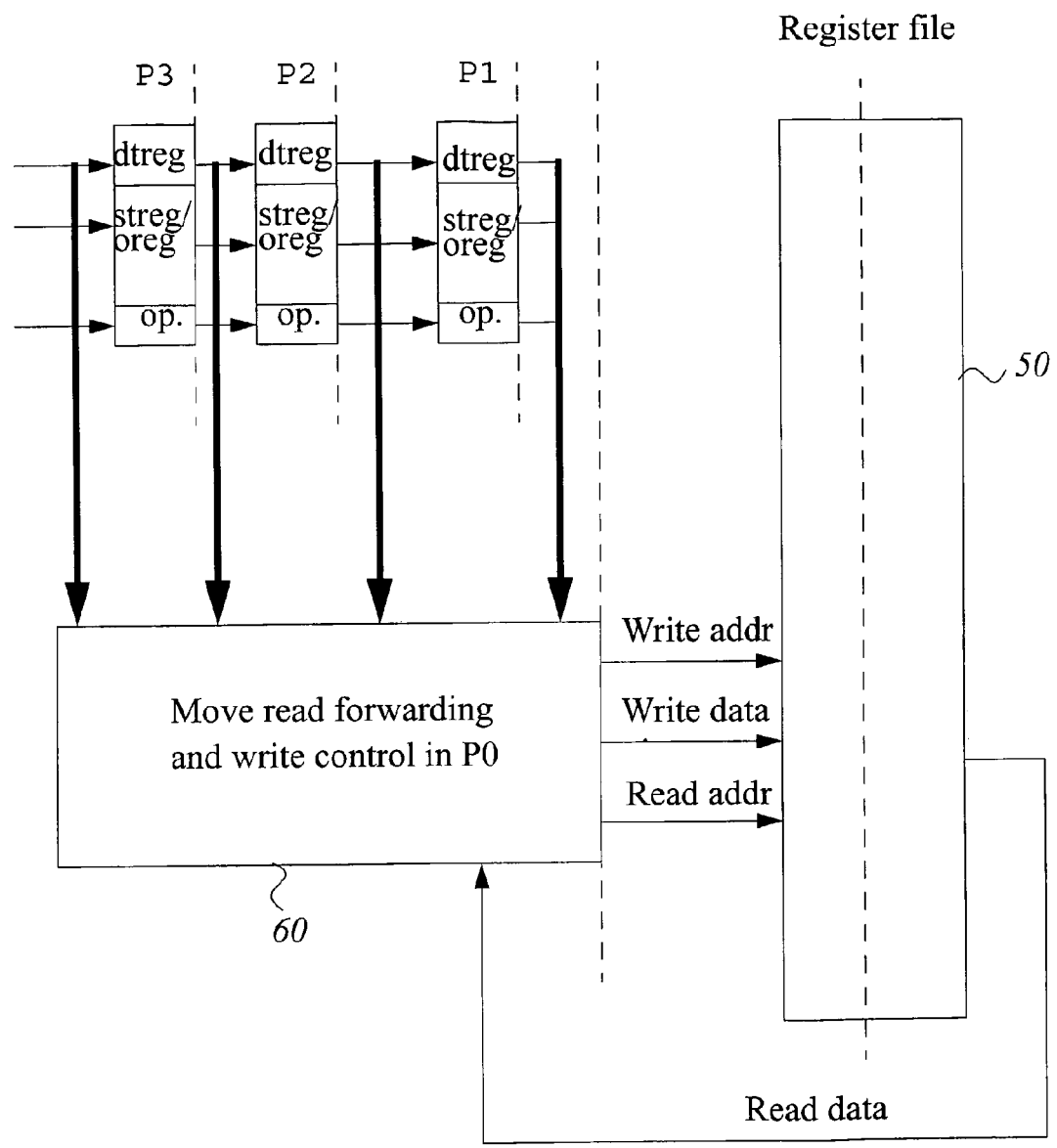
FIG. 6 illustrates an example of ghost register file pipe step logic for ensuring sequential consistency of the ghost register file operation.

For complex debugging, the ghost register file hence needs some logic to ensure this consistency. This is described with the help of FIG. 6 illustrating an example of ghost register file pipe step logic for ensuring sequential consistency of the ghost register file operation (depicting one operation stream).

As the ghost register file 50 needs to support as many operation streams as there are functional units in the machine this logic is to be duplicated. FIG. 6 omits the transport and writing of RWD and TMIA elements for brevity. The store to memory path, i.e. the data path to the execution pipe, and the store address path are also omitted.

In this example, a number of pipe registers (P1, P2, P3, ...) are introduced. These register contains the RWD flag, the TMIA value (both omitted in FIG. 6), the destination target register number (dtreg), the original register number (oreg, if the operation is an assignment) or the source target register (streg, if the operation is a move) and the operation indicator (assignment or move).

A forwarding and write control unit 60 preferably monitors the pipe register data and if a move operation is detected it will forward the source target register number (streg) to the read address port in order to have the data (OR value) from register file for writing when the move operation is in the last pipe stage.

If one or more assignments to the move operations source is detected in the pipe, the last OR assignment before the move, will be set up as the data to be written in the move write. In this case the outdated OR value delivered will be ignored.

This is preferably done by comparing the last pipe step registers destination target register number (write index into ghost file) with previous pipe step registers source target register number (if this pipe register contain a move operation). If these two target register index match, the register awaiting delivery of OR value from ghost file will be loaded with the last pipe register's OR value. The OR delivery from ghost file (outdated value) will be ignored next cycle and the new OR value written to the move's source register will be used.

This exemplary logic is explained by pseudo code below. The storage structure (registers) needed is named as elements in a port interface structure, P0, the last pipe step before ghost register file. Please note that the code is not complete, e.g. omitting the ignore flag handling. The store operation processing is omitted as well. Even though the store operation is a GRF read it does not write to the GRF but to the memory. All operations preceding the store upholds the consistency via move source address forwarding. The pseudo code is just given as an exemplary sketch to provide a better understanding of the logic.

```
P0.radr;    // Read address, used for move address forwarding
P0.rdata;   // Read data, OR value from a move's source
            // to be written to a move's destination when
            // the move operation is to be completed in
            // ghost file.
P0.we;      // Write enable.
P0.rdati;   // Read ignore flag, if data from ghost register
            // file is to be ignored.
P0.wadr;    // write address, write address used in assign
            // operations as well as last part of move
            // operations.
```

-continued
```
P0.wdata    // write data, either the OR value from
            // assignment operations or the OR value from
            // move operations. A move operation OR value
            // either originate from read of ghost file or
            // the write data of a assignment operation to
            // the move operation's source.
P0.wadr     // write address, assignment or move operations
            // destination.
```

The incoming data to the last pipe step in the forwarding and write control unit is data of the previous pipe steps P1, P2, P3.

```
{P3-P1}.dtreg;  // destination target register number,
                // write index into ghost register file
{P3-P1}.streg;  // source target register, read index into
                // ghost register file. Valid number if
                // operation is move.
{P3-P1}.oreg;   // original register number, OR data value.
                // Valid number if operation is
                // assignment.
{P3-P1}.op;     // operation, either nop, move or assignment
// If there is a move operation in the pipe
// it triggers a forwarding of the read address.
IF (P4.op == 'move')
THEN
    P0.radr := streg;
    P0.rdati := FALSE; // Accept data to be delivered.
ENDIF
IF (P1.op == 'assignment' )
// If operation to be performed is
// an assignment.
THEN
// .. load write addr. w/ dest. treg.
    P0.wadr := P1.dtreg;
//.. and explicit OR value to be written
    P0.wdata := P1.oreg;
    P0.we := TRUE;
ELSE
IF (P1.op == 'move' )
// If operation to be performed is
// a move.
THEN
// .. load write addr. w/ dest. treg.
    P0.wadr := P1.dtreg;
// .. and OR value loaded from ghost register file
    P0.wdata := P0.rdata;
    P0.we := TRUE;
ELSE
IF (P1.op == 'nop')
// If operation is a nop,
// disable write.
THEN
    P0.we := FALSE;
END
// If move is preceded by an operation which
// updates the move op's source.
IF ( P2.op == 'move' AND P2.streg == P1.dtreg)
THEN
    IF ( P1.op == 'assignment')
// .. and the preceding op is an assignment..
        THEN
// ..load data reg's with preceding op's
// OR value
            P0.rdata := P1.oreg;
// .. and ignore outdated value.
            P0.rdati := TRUE;
    ELSE
        IF (P1.op == 'move')
// .. else if preceding op is a move..
        THEN
// .. reuse preceding move's fetched
// OR value..
            P0.rdata := P0.rdata;
// .. and ignore this move's
// value from ghost file.
            P0.rdati := TRUE;
        ENDIF // If op's a NOP do nothing.
ENDIF
```

A larger read latency could be handled with more pipe steps. The handling of the forwarding and control of preceding updates of move operation's source contents will be somewhat more complex as the number of preceding operations increase.

The example above is simplified as it depicts only one operation stream. Preceding operations from other operations streams must be checked for move source modifying operations. The latency through register memory was also chosen to be low so no multiple move operations had to be checked. The presence of multiple move operations in the forwarding window will increase the number of storages needed for possible multiple modifying values.

The ghost register file 50 is off the critical path as the completion of operations towards the ghost register file could trail the operation producing activities with any appropriate number of cycles. This facilitates the placement of the ghost register file and it's small set of support logic anywhere on the chip. Just add a number of pipe steps in the operation transport path if place and route timing problems exist.

Ghost Register Operation Stream Processing

Figure 7:
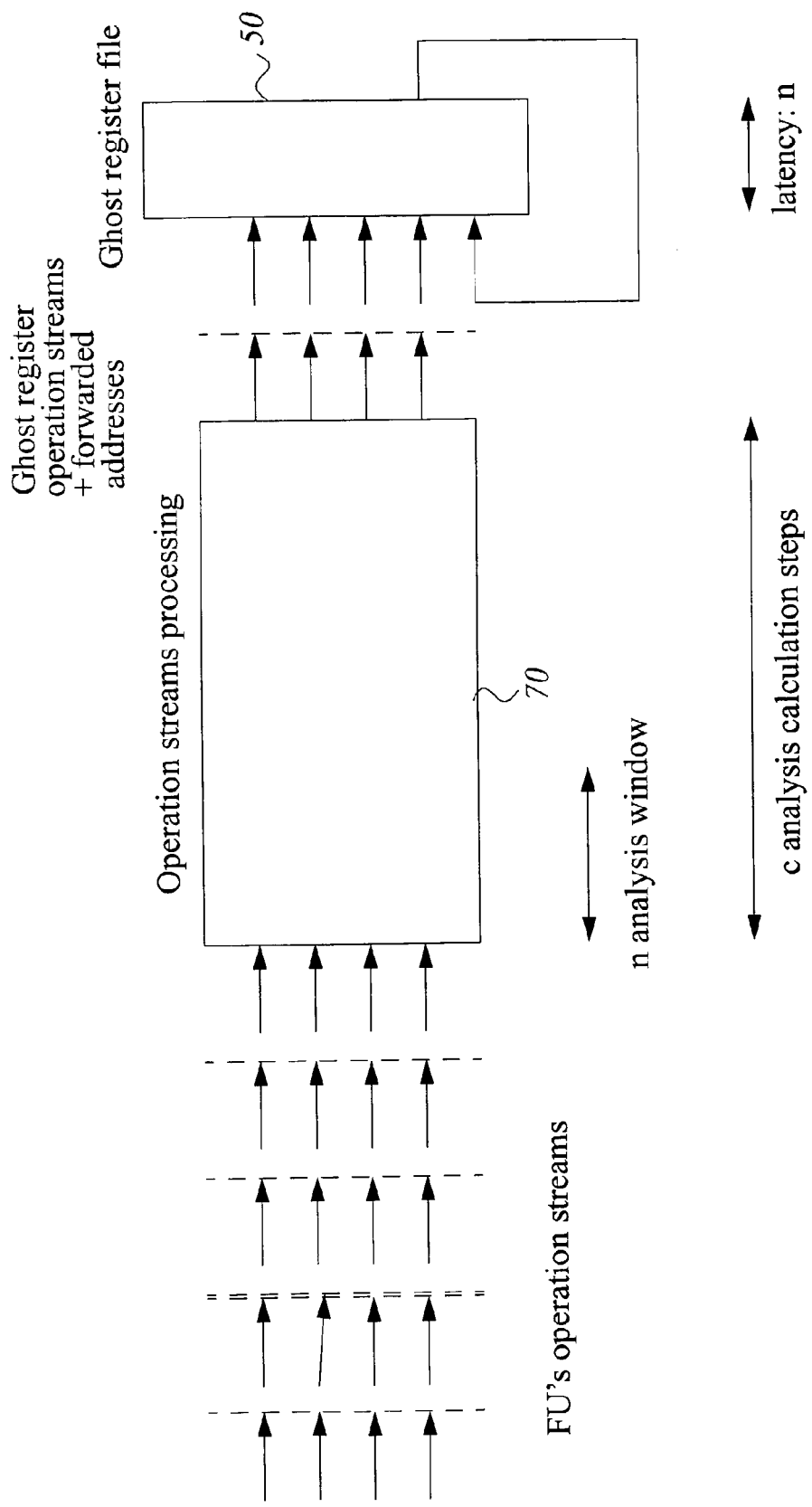
FIG. 7 illustrates an example of operation stream processing logic for selectively transforming ghost register file operations.

FIG. 7 illustrates an example of operation stream processing logic for selectively transforming ghost register file operations. The analysis of preceding operations could be moved backwards from the ghost register file 50 to ensure enough analysis time. The operation stream processing logic 70 filters the irrelevant instruction codes from functional units (FU:s) to ghost register file nop:s. It may furthermore squash forwarded move operations read addresses and replace the move operation with an assignment operation if the move was preceded by a source-modifying operation. The new assignment operation gets its destination register value from the preceding source modifying operation.

The operation stream processing will also transform some move operations to nop:s and assignment operations (see description of ghost register operation types above). It may also transform some load and stores (spill and reloads) to move operations (compare with description of register allocation below).

The processing 70 of the operation stream could be placed anywhere and the same goes for the ghost register file 50. There is no need for the ghost register file 50 and the operation processing 70 to be adjacent.

Debugger/Trace Utility Analysis

The utility reads the ghost register data from memory. Each snapshot taken will normally contain the following data:

The target machines instruction address (when snapshot occurred).

The ghost register file content.

The utility will now use the snapshot target machine instruction address to index itself into the target machine code. Here it will find a number of target machine (e.g. VLIW) primitives, each of them attributed by the instruction address of the original code.

These original code instruction addresses enables the utility to map itself back into the original code.

Compiler

The task of the compiler in this scheme is to tag the destination registers of instructions which assigns original register values to target registers. This is first done in the translation phase of the compiler, where each source statement is translated to one or several target statements. If the source statement assigns an original register, then at least one of the target statements will assign the value to a virtual or symbolic register which at this point represent the original register.

But the task of the compiler normally does not stop at the translation phase. The compiler has to maintain the tag on the virtual register throughout the optimization and register allocation phases until it finally passes the information on to the linker and the object format.

In the following it is assumed that either 'standard' or 'extra' coherency (pertaining to the write modes 2 and 3 above) has been given to the compiler as an option. If 'no' coherency is given an ordinary compilation is performed.

Translation Phase

The translation phase is the phase in the compiler where a source instruction is translated to a sequence of one or more target instructions. This is normally done by translating from an intermediate form representing the source program or object to an intermediate form representing the target program or object. Normally the translation is done towards a symbolic or virtual register set which is unlimited in size. In other words, the translation phase does not bother to assign target registers to the target instructions. Henceforth, when we speak of target registers we will mean virtual target registers until the register allocation phase.

It should though be understood that the expression "translation" also encompasses the overall code translation or conversion of the source code into target code, including optimizations and register allocations.

In this scheme, the task of the compiler in the translation stage is to tag the target destination register, for each translated instruction, with the number or name representing the original destination register. This tag is normally kept as an attribute in the intermediate form representing the target program. More specifically it is kept in the data structure representing the translated instruction.

The compiler chooses to tag the target instruction in the sequence of target instructions which represents a source instruction which performs the loading of the original register value into the target destination register.

This means that all target load instructions will not be tagged with the original destination register. For instance, address calculation instructions, temporary calculation instructions, index or pointer check or other runtime check instructions will of course not be tagged since they do not represent loads or original registers. This opens up the option of not invalidating or invalidating an original register value which lies in a target register that is assigned a non-original register value (see above).

Optimization Phases

The optimization phases are the phases where the target program, normally represented by an intermediate form, is optionally analysed, transformed and tailored to fit a particular target system. The register allocation and instruction scheduler explained later on can also be considered to be optimization phases.

In general, the task of the compiler in the optimization phases is to keep the original register tag (which the translation phase sets) on the target destination register of the instruction that loads the original register value throughout the transformations.

Different Cases Can Occur:

Tagged instruction is to be removed—if the option "extra" coherency is given to the compiler, the instruction is NOT removed but attributed with "write to ghost register only". If option "standard" coherency is given the instruction is removed.

Tagged instruction is to be replaced—the tag on the destination register is moved to the destination register in the instruction replacing the old instruction.

Tagged instruction is to be hoisted or sinked—The target instruction with the tag on the destination register unchanged is hoisted or sinked.

Register Allocation

Register allocation refers to the case where instances of the unlimited set of virtual or symbolic registers in the code are assigned physical register names from the target architecture. Since there are a limited number of physical registers in a machine, the register allocator sometimes inserts and removes instructions which loads, stores and moves register values in and out of memory and between registers. The storing and loading of register values to memory due to limited availability of free physical registers at a program point is called "spilling of registers". One instance of a virtual register is thus not necessarily mapped to one instance of a physical register.

The task of the register allocator is just as for the other phases to keep the original register tag on the target destination register throughout the register allocation phase, regardless of the different intermediate representation of the target register in the different stages of the register allocation.

For tracking mode "source register value only" it does only have to concern itself with maintaining the tag in the assignments. This will lead to the ghost register file being assigned with values in the ghost registers at runtime.

For tracking mode "tracking original register values in target register values" the move operation in the ghost register file will take care of the tracking of values between registers. However, in order to be able to track original register values that have been spilled to memory and then reloaded, the spill code generator of the register allocator has to tag the inserted load instruction's destination register with the original register name or number if that can be statically deduced. If not, the spill code has to include a ghost register move from the spilled register to the spill area of the ghost register file and the reload code must include a move from the ghost register file spill area into the area of the ghost register file which corresponds to the target register set.

The dynamic case may be encoded in the following way:

A spill store is marked by the compiler so that it reaches the ghost register file. The processing logic of the ghost register file transforms the spill store to a move which transfers the ghost register data to the spill area.

The reload load instruction is marked by the compiler so that the processing logic of the ghost register file transforms it to a move from the spill area into the area of the ghost register file which corresponds to the target register set (the normal load that reaches the ghost register file is transformed to an assignment). The reload load's OR-value is assigned the spilled target register number by the compiler, this is then used as source register operand in the ghost register move operation.

This is expressed in Table III below and also illustrated in FIG. 8.

TABLE III

| Target instruction | Corresponding operation in ghost register file |
|---|---|
| st.spill treg, ADDR_spillpos. | mv treg + size, treg |
| ld.reload treg [OR == spilled treg], ADDR_spillpos. | mv treg, [OR] + size |

Figure 8:
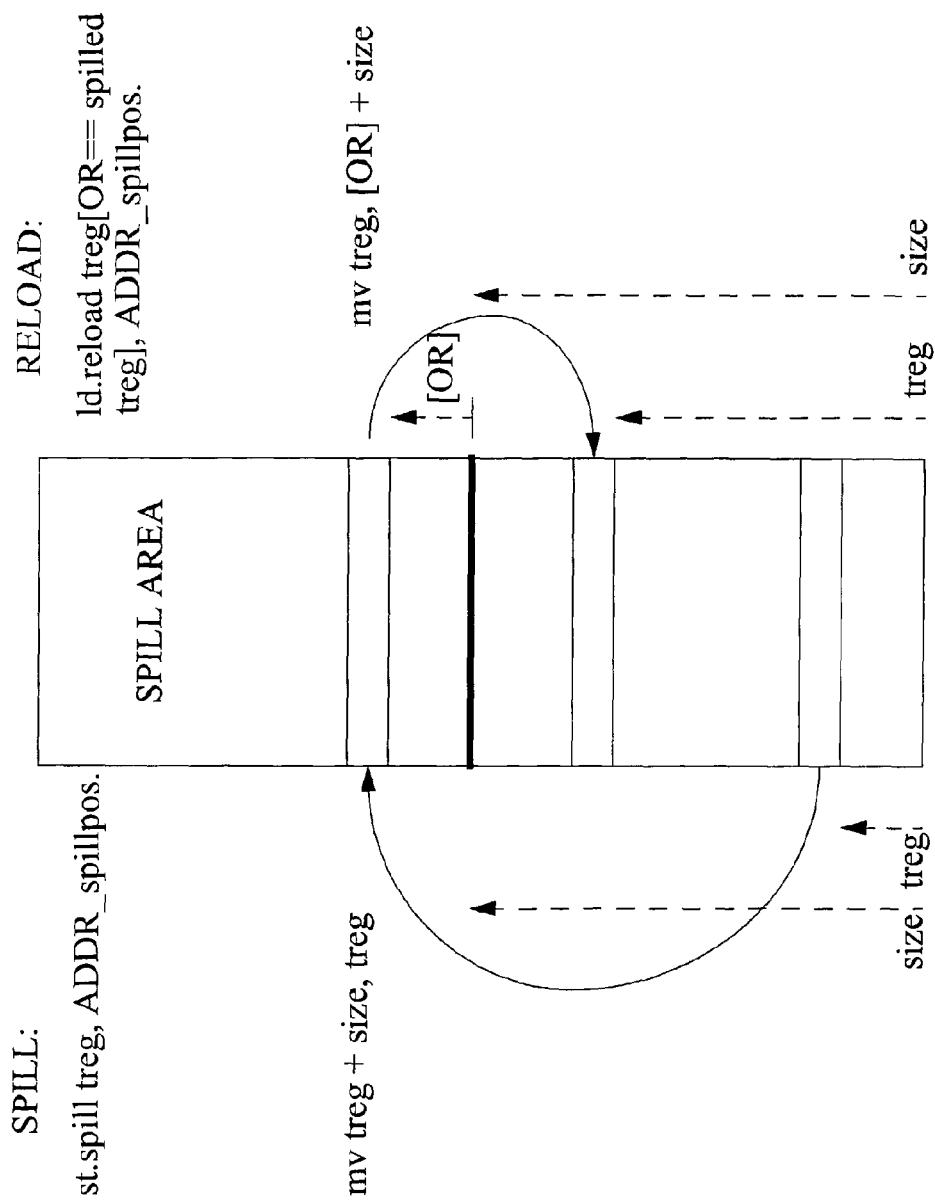
FIG. 8 illustrates examples of spill and reload operations in the ghost register file according to a preferred embodiment of the invention.

FIG. 8 illustrates examples of spill and reload operations in the ghost register file 50 for a "dynamic" case.

Since the tracking mode is a processor state, a compiler that supports both tracking modes must tag the reload code if it is possible or else introduce moves to and from the ghost register file's spill area.

Instruction Scheduler

The instruction scheduler is the phase where instructions are placed in the code stream so that both the micro-architecture of the machine is utilised efficiently and so that the latency and hardware resource constraints are not broken by the code and of course also that the semantics of the program is preserved.

This could lead to instructions being moved in the sequential code stream and for a VLIW system, this phase also means the parallelizing of instructions into VLIW words.

In this scheme, the instruction scheduler keeps the original register tags on the instructions.

Linker

The linker is the phase where relocatable addresses are being resolved into physical addresses. The registers are normally not touched here, but if there are link time optimizations, the same rules apply for them as for optimizations in the compiler.

As indicated previously, the operations (assign, nop, move) of the ghost register could instead be directed against an ordinary transaction memory. The backward analysis is then left to an analysis stage (implemented in SW) after the off-loading of the trace data or to a debugger. The compactation of the data is lost here. The ghost register file's support logic is then traded for a larger set of data (operation transactions) and the off-line multipass reconstruction of a ghost register image. The trace must be sufficiently large to accommodate actions defining all target registers, definitions which will always be direct accessible when a ghost register file is present.

Tracking Values in Memory-Allocated Variables in General High-level Case

When tracking values of variables, the encoding of the ghost register word as described above is different. Instead of the OR-field holding the original register number, the OR-field now represents a variable in a certain context. The encoding is done by the translation system (compiler/linker) so that each live variable in a program address range has a unique encoding number. This variable encoding field is henceforth called Variable Encoding (VE).

The encoding must be presented to the debugger/trace system as output from the translation system. The TMIA-field is the key to the resolution of the variable encoding, since the TMIA is always included in an address range which always have a unique variable identity for the VE associated with the TMIA.

The compiler tags each target instruction which loads a register from a variable with a variable encoding number. As in the register coherency case, this leads to assignments in the ghost register file or equivalent module. When variable values are moved between target registers, this leads, as in the register coherency case to move operations in the ghost register file.

It should be noted that the spill area of the ghost register file is not needed in the variable value tracking case, since a register holding a variable value is always spilled to the variables memory location. Then, of course the compiler has to tag the instruction which reloads the variable into the target register file.

This approach shows the residency and current values of variables that are present in the registers.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] "Evicted Variables and the Interaction of Global Register Allocation and Symbolic Debugging", Ali-Reza Adl Tabatabai, Thomas Gross, Proceeding of the 20th ACM symposium on Principles of Programming Languages.
[2] JP 8221296
[3] U.S. Pat. No. 6,185,732
[4] JP 2000 181746
[5] U.S. Pat. No. 6,094,729
[6] U.S. Pat. No. 6,243,304
[7] "Computer Architecture, A Quantitative Approach", John L. Hennessy, David A. Patterson, Morgan Kaufmann Publishers, chapter 3.4 'Data Hazards'.

The invention claimed is:

1. A method for supporting tracking of data values of original source code at execution of a translated version of the source code, referred to as target code, on a computer system, said method comprising the steps of:
   associating, during program code translation, references to target data value containers in target code instructions with corresponding address information of original data value containers of the source code;
   storing, at execution of target code, information related to target code instructions together with associated address information of original data value containers of the source code to uphold a data value view of the original source code representation, wherein the information related to target code instructions together with associated address information of original data value containers of the source code is written into a ghost register file; and
   upholding sequential consistency of ghost register file operation based on multiple pipe registers for handling read latency to consistently reflect the residency in the target system of original data value containers.

2. The method of claim 1, wherein said step of associating references to data value containers in target code instructions comprises the step of tagging target code instructions with corresponding data value container address information of the original source code.

3. The method of claim 1, wherein said information related to target code instructions includes at least one of:
   corresponding target instruction address information; and
   corresponding instruction operand values to enable tracking of values of original data value containers without reference to target data value containers.

4. The method of claim 1, wherein said step of storing comprises the step of writing said information related to target code instructions together with associated data value container address information of the original source code into a ghost register file.

5. The method of claim 4, further comprising the step of moving data value container address information of the original source code from a first ghost register to a second ghost register in the ghost register file.

6. The method of claim 4, wherein address information of a target data value container represented in a target code instruction indexes the ghost register file.

7. The method of claim 4, further comprising operation stream processing for selectively transforming ghost register file operations.

8. The method of claim 1, wherein said target instructions includes at least one target instruction representing an assignment of an original data value container in the source code.

9. The method of claim 1, wherein original data value containers of the source code correspond to an original register set, and target data value containers of the target code correspond to a target register set, and said step of storing comprises the step of writing said information into a ghost register file for upholding a register view of the original source code, thus supporting register coherence between the original register set and the target register set.

10. The method of claim 1, wherein the original source code is adapted for an original computer system and the target code is adapted for a target computer system different from the original system.

11. The method of claim 1, wherein said data value containers correspond to memory allocated variables in a general high-level programming language.

12. A system for supporting data value coherence between original program code and a translated version of the original program code, referred to as target code, said system comprising:
    means for storing, at execution of the target code, information related to at least one target code instruction representing an assignment of a data value container in the original code together with associated address information of the original data value container to uphold a data value view of the original program code, wherein the storing means is configured to write the information related to the at least one target code instruction together with associated address information of the original data value container into a ghost register file; and
    logic for upholding sequential consistency of ghost register file operation based on multiple pipe registers for handling read latency.

13. The system of claim 12, wherein the system is configured to associate references to target data value containers in target code instructions with corresponding address information of original data value containers of the original code during program code translation.

14. The system of claim 12, wherein said information related to target code instructions includes at least one of:
    corresponding target instruction address information; and
    corresponding instruction operand values to enable tracking of values of original data value containers without reference to target data value containers.

15. The system of claim 12, wherein said means for storing comprises means for writing said information related to said at least one target code instruction together with associated address information of the original data value container into a ghost register file.

16. The system of claim 15, further means for moving data value container address information of the original code from a first ghost register entry to a second ghost register entry in the ghost register file.

17. The system of claim 15, wherein address information of a target data value container represented in a target code instruction indexes the ghost register file.

18. The system of claim 15, wherein operations on the ghost register file include assignment, move, store and nop operations, and said system further comprises operation stream processing logic for selectively transforming ghost register file operations.

19. The system of claim 12, further comprising a debug utility for performing debugging and/or trace analysis of original program code based on the stored information.

20. The system of claim 12, wherein original data value containers of the original program code correspond to an original register set, and target data value containers of the target code correspond to a target register set, and said means for storing comprises means for writing said information into a ghost register file for upholding a register view of the original program code, thus supporting register coherence between the original register set and the target register set.

21. The system of claim 20, wherein the original source code is adapted for an original computer system and the target code is adapted for a target computer system different from the original system.

22. The system of claim 12, wherein said data value containers correspond to memory positions allocated to variables in a general high-level programming language.

23. A system for supporting data value coherence between original program code and a translated version of the original program code, referred to as target code, said system comprising:
    a processor; and
    a non-transitory memory device for storing computer program instructions;
    wherein when the processor executes the computer, program instructions, the processor causes the system to;
        tag references to target data value containers in target code instructions with corresponding address information of original data value containers of the original program code during program code translation to enable providing a data value container view of the original code at execution of the target code;
        write the tagged references to target data value containers in target coda instructions and the corresponding address information of original data value containers of the original program code into ghost register files; and
        uphold sequential consistency of ghost register file operation based on multiple pipe registers for handling read latency.

* * * * *

UNITED STATES PATENT AND TRADEMARK OFFICE
CERTIFICATE OF CORRECTION

| | | |
|---|---|---|
| PATENT NO. | : 8,095,915 B2 | |
| APPLICATION NO. | : 11/911265 | |
| DATED | : January 10, 2012 | |
| INVENTOR(S) | : Winberg et al. | |

It is certified that error appears in the above-identified patent and that said Letters Patent is hereby corrected as shown below:

In Column 22, Line 38, in Claim 23, delete "computer," and insert -- computer --, therefor.

In Column 22, Line 39, in Claim 23, delete "to;" and insert -- to: --, therefor.

In Column 22, Line 47, in Claim 23, delete "coda" and insert -- code --, therefor.

Signed and Sealed this
Twentieth Day of March, 2012

David J. Kappos
*Director of the United States Patent and Trademark Office*